US009250080B2

(12) United States Patent
Morrison et al.

(10) Patent No.: US 9,250,080 B2
(45) Date of Patent: Feb. 2, 2016

(54) SENSOR ASSISTED VALIDATION AND USAGE OF MAP INFORMATION AS NAVIGATION MEASUREMENTS

(71) Applicant: QUALCOMM Incorporated, San Diego, CA (US)

(72) Inventors: William James Morrison, San Francisco, CA (US); Wyatt Thomas Riley, Chesterbrook, PA (US); Yuhua Hu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/157,305

(22) Filed: Jan. 16, 2014

(65) Prior Publication Data

US 2015/0204670 A1     Jul. 23, 2015

(51) Int. Cl.
*G01C 21/10* (2006.01)
*G01S 19/45* (2010.01)
*G01C 21/00* (2006.01)
*G01C 21/12* (2006.01)

(52) U.S. Cl.
CPC ............. *G01C 21/00* (2013.01); *G01C 21/12* (2013.01)

(58) Field of Classification Search
USPC ..................................... 701/428; 342/357.28
See application file for complete search history.

(56) References Cited

U.S. PATENT DOCUMENTS

| 5,742,923 | A | 4/1998 | Odagawa | |
| 8,164,514 | B1 * | 4/2012 | Yang et al. | 342/357.28 |
| 2004/0181335 | A1 | 9/2004 | Kim et al. | |
| 2010/0097208 | A1 * | 4/2010 | Rosing et al. | 340/539.13 |
| 2010/0109948 | A1 * | 5/2010 | Razoumov et al. | 342/357.14 |
| 2010/0245561 | A1 | 9/2010 | Yamaguchi et al. | |
| 2012/0072166 | A1 * | 3/2012 | Keal et al. | 702/150 |
| 2013/0054130 | A1 | 2/2013 | Ye et al. | |
| 2013/0267260 | A1 * | 10/2013 | Chao et al. | 455/457 |
| 2014/0232570 | A1 * | 8/2014 | Skinder et al. | 340/989 |
| 2014/0288828 | A1 * | 9/2014 | Werner et al. | 701/527 |
| 2014/0350850 | A1 * | 11/2014 | Kmiecik et al. | 701/487 |

FOREIGN PATENT DOCUMENTS

| WO | 9323821 A1 | 11/1993 |
| WO | 2009145695 A1 | 12/2009 |
| WO | 2012154926 A2 | 11/2012 |
| WO | WO-2013149149 A1 | 10/2013 |

OTHER PUBLICATIONS

International Search Report and Written Opinion—PCT/US2014/072364—ISA/EPO—Mar. 27, 2015.

* cited by examiner

*Primary Examiner* — Thomas G Black
*Assistant Examiner* — Tyler Paige
(74) *Attorney, Agent, or Firm* — Muncy, Geissler, Olds & Lowe, P.C.

(57) ABSTRACT

Navigation solutions for a pedestrian or vehicle user are obtained by determining whether the direction and location of the user obtained from a map at least substantially conform to the direction and location of the user based on one or more measurements obtained from one or more sensors, and if the direction and location of the user obtained from the map at least substantially conform to the direction and location of the user based on one or more measurements obtained from one or more sensors, computing the navigation solutions based, at least in part, on the direction and location of the user.

26 Claims, 5 Drawing Sheets

SENSOR ASSISTED VALIDATION AND USAGE OF MAP INFORMATION AS NAVIGATION MEASUREMENTS

FIELD OF DISCLOSURE

Various embodiments described herein relate to navigation, and more particularly, to sensor assisted validation and usage of map information as navigation measurements.

BACKGROUND

Various satellite-based navigation systems such as the Global Positioning System (GPS) and Global Navigation Satellite System (GNSS) have been utilized by individual users for navigation. For example, satellite-based navigation devices, which may be either stand-alone devices or integrated as part of handheld mobile telephones or tablets, have been used by individuals who need navigation instructions as drivers or pedestrians. Satellite based navigation systems have also been provided as integral parts of motor vehicles. A typical navigation device is capable of not only indicating the current position, but also providing recommended routes, turn-by-turn instructions, and expected time of travel, and so on, based on signals received from navigation satellites as well as digital maps and road information stored in the memory or storage medium of the navigation device.

A conventional navigation device typically requires nearly constant good reception of satellite-based navigation signals for updating the current position of the device on the map. Good reception of satellite-based navigation signals, however, is not guaranteed in all environments. For example, in close proximity to tall buildings or other obstructions, GPS or GNSS signals are often degraded due to reflections, attenuations or multipath effects. When a user is inside a building with walls, beams, and other structures that reflect or absorb radio waves, for example, reception of GPS or GNSS signals may be significantly degraded. Degraded reception of satellite-based navigation signals due to various environmental effects, such as the presence of buildings, other structures or natural obstructions, may result in unreliable or inaccurate navigation solutions.

SUMMARY

Exemplary embodiments of the invention are directed to apparatus and method for obtaining navigation measurements through sensor assisted validation or usage of map information, for environments in which signals from satellite-based systems, such as Global Positioning System (GPS) or Global Navigation Satellite System (GNSS), are not available or are degraded due to reflections, attenuations or multipath effects.

In an embodiment, a method of obtaining one or more navigation solutions is provided, the method comprising: determining whether direction and location of a user obtained from a map at least substantially conform to direction and location of the user based on at least one measurement obtained from at least one sensor; and computing at least one navigation solution based, at least in part, on the direction and location of the user based upon a determination that the direction and location of the user obtained from the map at least substantially conform to the direction and location of the user based on said at least one measurement obtained from said at least one sensor.

In another embodiment, an apparatus configured to perform operations to obtain one or more navigation solutions is provided, the apparatus comprising: a memory; and a processor for executing a set of instructions stored in the memory, the set of instructions for: determining whether direction and location of a user obtained from a map at least substantially conform to direction and location of the user based on at least one measurement obtained from at least one sensor; and computing at least one navigation solution based, at least in part, on the direction and location of the user based upon a determination that the direction and location of the user obtained from the map at least substantially conform to the direction and location of the user based on said at least one measurement obtained from said at least one sensor.

In another embodiment, an apparatus configured to perform operations to obtain one or more navigation solutions is provided, the apparatus comprising: means for determining whether direction and location of a user obtained from a map at least substantially conform to direction and location of the user based on at least one measurement obtained from at least one sensor; and means for computing at least one navigation solution based, at least in part, on the direction and location of the user based upon a determination that the direction and location of the user obtained from the map at least substantially conform to the direction and location of the user based on said at least one measurement obtained from said at least one sensor.

In another embodiment, a machine-readable storage medium encoded with instructions executable to perform operations to obtain one or more navigation solutions is provided, the operations comprising: determining whether direction and location of a user obtained from a map at least substantially conform to direction and location of the user based on at least one measurement obtained from at least one sensor; and computing at least one navigation solution based, at least in part, on the direction and location of the user based upon a determination that the direction and location of the user obtained from the map at least substantially conform to the direction and location of the user based on said at least one measurement obtained from said at least one sensor.

Some exemplary embodiments of the invention are described below in the Detailed Description and illustrated by the drawings. The invention, however, is defined by the claims and is not limited by the exemplary embodiments described and illustrated.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the," are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise.

Furthermore, many embodiments are described in terms of sequences of actions to be performed by, for example, elements of a computing device. It will be recognized that various actions described herein can be performed by specific circuits, such as application specific integrated circuits (ASICs), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
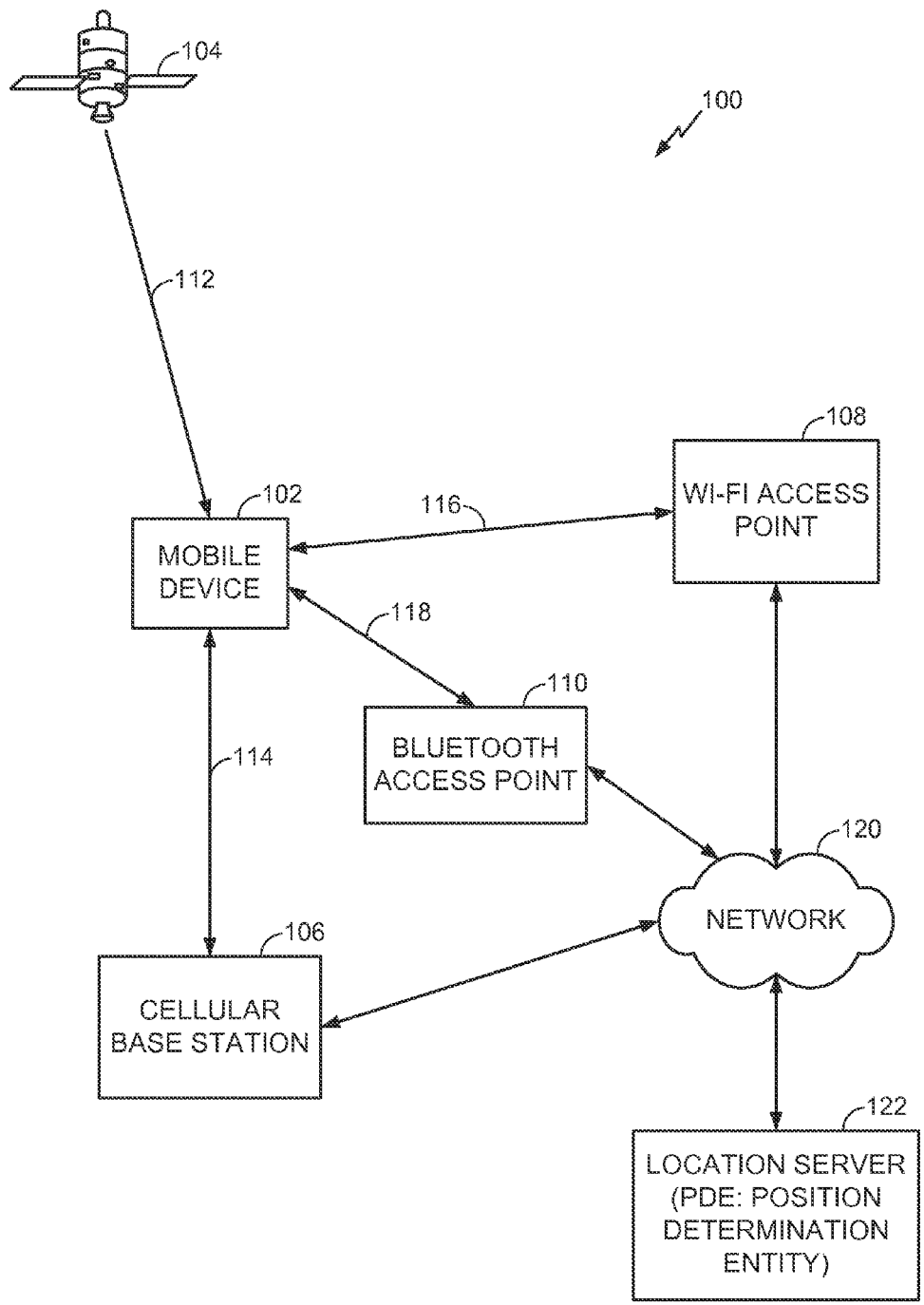
FIG. 1 is a diagram illustrating a position locating environment which allows a mobile device to obtain navigation solutions.

FIG. 1 is a diagram illustrating a position locating environment 100 in which a mobile device 102 is capable of obtaining navigation solutions by receiving positioning signals from one or more satellite or terrestrial based wireless navigation sources, including, for example, one or more Global Positioning System (GPS) or Global Navigation Satellite System (GNSS) satellites, such as satellite 104, one or more cellular base stations, such as cellular base station 106, one or more Wi-Fi access points, such as Wi-Fi access point 108, or one or more Bluetooth access points, such as Bluetooth access point 110. The mobile device 102 may be a mobile cellular telephone, a tablet, another type of handheld device carried by a human user, a vehicle mounted device, or any other device that may move or be moved from one location to another.

The mobile device 102 may be able to obtain relatively accurate positioning data from the satellite 104 if the signal path 112 from the satellite 104 to the mobile device 102 is unobstructed or has relatively little signal degradation due to various environmental factors. The mobile device 102 typically does not transmit feedback signals to the satellite 104, and thus the signal path 112 is shown as a unidirectional arrow in FIG. 1. When the mobile device 102 is in or near a tall building or structure, such as a concrete or steel structure, for example, reception by the mobile device 102 of positioning signals from the satellite 104 may be degraded. Although coding schemes such as CDMA have been implemented in satellite-based navigation systems such as GPS in an attempt to overcome the adverse effect of multipath degradation, reception of satellite signals by the mobile device 102 may still be significantly degraded by the multipath effect due to reflections from structural walls or beams, for example, as well as attenuations if the navigation signals need to travel through windows or walls, for example, before reaching the mobile device 102.

As illustrated in FIG. 1, the mobile device 102 may also be able to obtain estimated location information from the cellular base station 106, the Wi-Fi access point 108, or the Bluetooth access point 110. Various conventional schemes have been devised for the mobile device 102 to obtain estimated location information from cellular, Wi-Fi or Bluetooth networks. Because the mobile device 102 is capable of receiving signals from and sending signals to the cellular base station 106, the signal path 114 between the mobile device 102 and the cellular base station 106 is shown as a bidirectional arrow in FIG. 1. Likewise, the mobile device 102 is also capable of bidirectional communications with the Wi-Fi access point 108 and the Bluetooth access point 110, and thus the signal path 116 between the mobile device 102 and the Wi-Fi access point 108 and the signal path 118 between the mobile device 102 and the Bluetooth access point 110 are also shown as bidirectional arrows in FIG. 1. The cellular base station 106, Wi-Fi access point 108 and Bluetooth access point 110 may be connected directly or indirectly to one or more networks 120, which may be connected directly or indirectly to a location server 122 having a position determination entity (PDE). In typical terrestrial based wireless networks, location servers are provided to determine estimated locations of mobile devices, and the estimated location of the mobile device 102 may be transmitted from the cellular base station 106, the Wi-Fi access point 108, or the Bluetooth access point 110 back to the mobile device 102.

Terrestrial based wireless networks may serve as supplemental position locating systems to satellite based systems. For example, Assisted GPS (A-GPS) protocols have been devised for cellular networks to assist in position location of mobile devices in environments in which the reception of satellite signals is less than ideal. Such A-GPS protocols have been standardized in various mobile communication standards such as GSM, CDMA, WCDMA and LTE, and are known to persons skilled in the art. Other position locating schemes, such as cell-site multilateration, have been also devised for terrestrial based wireless networks. Various conventional position locating schemes have also been devised for Wi-Fi networks. Moreover, hybrid positioning systems have been devised which utilize satellite-based positioning systems such as GPS or GNSS combined with one or more terrestrial based wireless systems, such as cellular, Wi-Fi, Bluetooth, or other terrestrial based positioning systems. Typical terrestrial based positioning systems may require one or more location servers, such as A-GPS servers or Location Based Service (LBS) servers, to process position location data and transmit them to the mobile devices.

Figure 2:
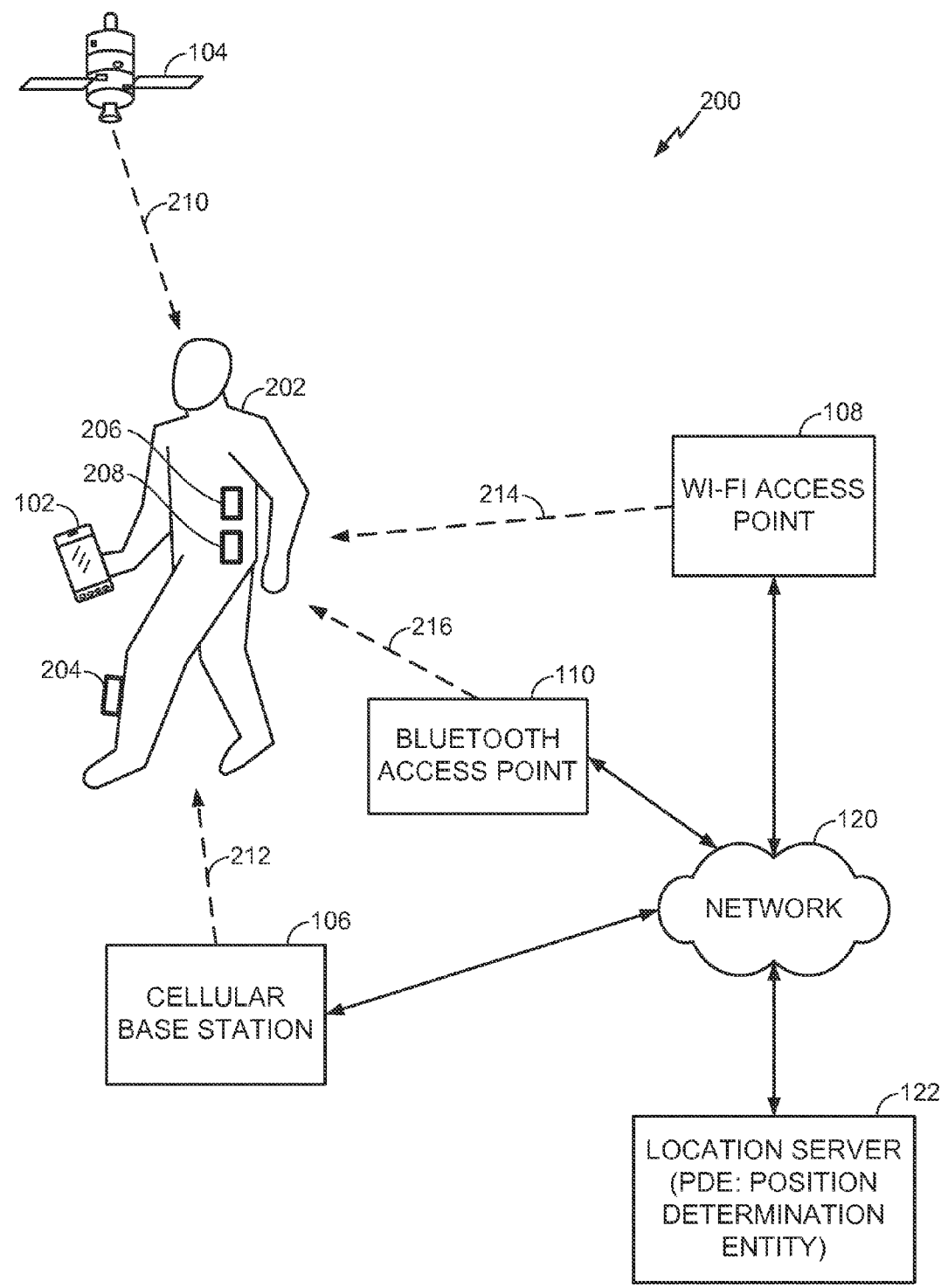
FIG. 2 is a diagram illustrating a position locating environment in which a pedestrian user has limited or no access to one or more wireless navigation systems.

FIG. 2 is a diagram illustrating a degraded position locating environment 200 in which a pedestrian user 202 has limited or no access to one or more wireless navigation systems. For example, if the user 202 is in or near a tall building or structure, or in an "urban canyon," navigation measurements based solely on signals received from the satellites may be seriously degraded. The user 202 may rely on terrestrial based wireless signals, for example, signals transmitted by the cellular base station 106, the Wi-Fi access point 108, or the Bluetooth access point 110, to assist in the navigation of the user 202. However, cellular signal reception may also be weak or non-existent in a building or structure, and Wi-Fi or Bluetooth access may not be available in all locations.

In an embodiment, the pedestrian user 202 is equipped with a mobile device 102 and a pedometer 204, which is capable of determining whether the user 202 is walking and measuring the number of steps or the amount of distance walked. In an embodiment, the pedestrian user 202 is also equipped with an accelerometer 206 and a gyroscope 208. The accelerometer 206 and the gyroscope 208 may be provided as separate devices as shown in FIG. 2. Alternatively, the accelerometer 206 and the gyroscope 208 may be integrated as part of the mobile device 102 or as part of the pedometer 204. The pedometer 204 may communicate measured data to the mobile device 102 by wired or wireless connections. Likewise, if the accelerometer 206 and the gyroscope 208 are provided as separate devices, they may also communicate measured data to the mobile device 102 by wired or wireless connections. For example, if the pedometer 204, the accelerometer 206 and the gyroscope 208 are provided as separate devices, the mobile device 102 may receive data inputs from the pedometer 204, the accelerometer 206 or the gyroscope 208 through wired connections, for example, USB, Mini-USB or Micro-USB connections, or through wireless connections, for example, Bluetooth, Wi-Fi or ultra-wideband (UWB) connections.

In an embodiment, a digital map which at least covers the location and vicinity of the user 202 is stored in the mobile device 102. In an embodiment, such a digital map may be stored in the memory of the mobile device 102 as part of a navigation system which would normally receive accurate positioning inputs from navigation satellites, for example, GPS or GNSS satellites, or from terrestrial base stations, such as the cellular base station 106. When signal reception from navigation satellites or terrestrial base stations is unimpeded, the mobile device 102 would be able to locate its position accurately on the digital map corresponding to the geographic position, that is, the longitude and latitude of the mobile device 102, based on signals received from navigation satellites or terrestrial base stations.

In an embodiment, measurements to help determine the direction or trajectory information of the pedestrian user 202 may be taken by one or more sensors, for example, the pedometer 204, the accelerometer 206, or the gyroscope 208 as shown in FIG. 2. Measurements from the pedometer 204 may be used to determine whether the pedestrian user 202 is walking, for example. Measurements from the accelerometer 206 or the gyroscope 208 may be used to determine whether the pedestrian user 202 is walking in a straight line or is turning, for example. The accelerometer 206 may also be used to determine whether the pedestrian user 202 is accelerating, decelerating, or walking at a constant velocity. The pedestrian user 202 may be equipped with other types of sensors in addition or as alternatives to the pedometer 204, the accelerometer 206 and the gyroscope 208 to help determine the velocity and heading of the pedestrian user 202 within the scope of the invention.

In an embodiment, an initial determination is made by using one or more sensors as to whether the direction and location information obtained from a map represents the direction and location of the user. In case of a pedestrian user, such as the pedestrian user 202 equipped with a mobile device 102, a pedometer 204, an accelerometer 206 and a gyroscope 208 as shown in FIG. 2, for example, the pedometer 204 may be used to determine whether the user 202 is walking, and measurements from the accelerometer 206 or the gyroscope 208 may be used to determine whether the user 202 is walking in a straight line, that is, not turning. Measurements obtained from one or more sensors, such as the pedometer 204, the accelerometer 206, or the gyroscope 208, may be processed to derive trajectory information of the user 202, for example. This trajectory information obtained from one or more sensors may be compared to the direction and location information obtained from a map, such as a digital map stored in the mobile device 102, to determine whether the direction and location information obtained from the map represents the direction and location of the user 202 with at least a sufficient level of accuracy.

In a further embodiment, if a sufficiently reliable navigation solution is obtainable from one or more wireless sources, for example, a GPS or GNSS satellite 104, a cellular base station 106, a Wi-Fi access point 108, or a Bluetooth access point 110, such a navigation solution may be combined with measurements obtained from one or more sensors carried by the pedestrian user 202 to determine whether the direction and location information obtained from the map represents the direction and location of the user, and an estimate of the level of uncertainty of the direction and location information obtained from the map. In an embodiment, the sensor itself may be a GPS or GNSS receiver, a cellular receiver, a Wi-Fi receiver or a Bluetooth receiver. Given a sufficient distance to travel in a straight line and a navigation solution of sufficient accuracy, a determination is made as to whether the direction and location information obtained from the map is sufficiently representative of the direction and location of the user 202. In FIG. 2, it is assumed that the wireless environment for the pedestrian user 202 is less than ideal for satellite and terrestrial signal receptions, and thus the signal path 210 from the satellite 104 to the user 202, the signal path 212 from the cellular base station 106 to the user 202, the signal path 214 from the Wi-Fi access point 108 to the user 202, and the signal path 216 from the Bluetooth access point 110 to the user 202 are shown as dashed arrows.

At a given time, signal reception from one or more of the satellite or terrestrial based wireless navigation sources might be more reliable than others. In an embodiment, navigation solutions from wireless navigation sources with sufficiently reliable reception may be retained while navigation solutions based on unreliable or sporadic signal reception may be discarded. In an embodiment, sufficiently reliable navigation solutions from satellite or terrestrial wireless navigation sources may be combined and averaged, or combined and weighted averaged, for example, with trajectory information based on measurements obtained from one or more sensors carried by the pedestrian user 202, for example, the pedometer 204, the accelerometer 206, or the gyroscope 208, to generate sensor-assisted direction and location information.

In an embodiment, the sensor-assisted direction and location information is compared to the direction and location information obtained from the map in the mobile device 102 to determine whether the direction and location information obtained from the map at least substantially conforms to the sensor-assisted direction and location information, and the estimated level of uncertainty of the direction and location information obtained from the map. In an embodiment, the direction derived from the map and the uncertainty of the map-derived direction are processed in a navigation filter. In an embodiment, the uncertainty of the map-derived direction may be expressed as a directional covariance. In a further embodiment, the location derived from the map and the uncertainty of the map-derived location are also processed in the navigation filter. In an embodiment, the uncertainty of the map-derived location is expressed as a locational covariance. In an embodiment, the navigation filter for processing the map-derived direction and location and their uncertainties or covariances resides in a computer having a processor and a memory, which may be embedded in the mobile device 102, for example. In an embodiment, directional covariance may be obtained by performing statistics based on repeated comparisons of the direction of the user derived from the map and the direction of the user based on sensor measurements, while locational covariance may be obtained by performing statistics based on repeated comparisons of the location of the user derived from the map and the location of the user based on sensor measurements, for example.

The computer in the mobile device 102 may include a memory and a processor for executing a set of instructions stored in the memory to compute one or more navigation solutions based, at least in part, on the map-derived direction and location and the uncertainties or covariances based on sensor-assisted direction and location. Navigation solutions may include, for example, directional instructions to the pedestrian user 202 to walk from the current location to a destination, estimated time of arrival based on the walking speed of the pedestrian user 202, and so on. For the pedestrian user 202, actual heading is often variable and inconsistent with map information, for example, when the user walks diagonally across a street or within a region not detailed on the map, such as an indoor location. In such a situation, the direction and location information obtained from the map is compared to sensor-assisted direction and location information to estimate the uncertainties or covariances based on the two sets of direction and location information. The map-derived direction and location and their uncertainties or covariances are provided to a navigation filter to compute navigation solutions for the pedestrian user 202.

Figure 3:
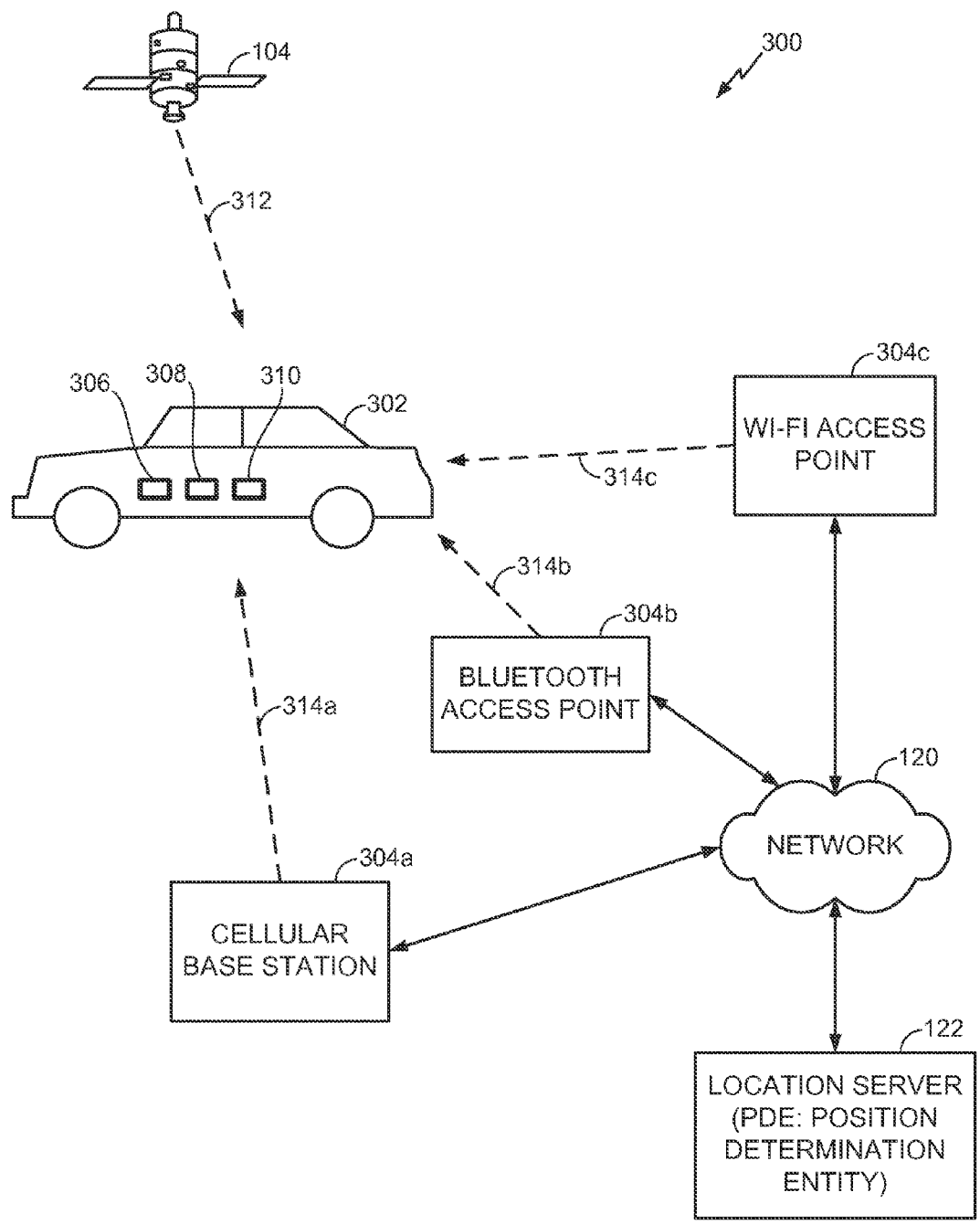
FIG. 3 is a diagram illustrating a position locating environment in which a motor vehicle has limited or no access to one or more wireless navigation systems.

FIG. 3 is a diagram illustrating a degraded position locating environment 300 in which a motor vehicle 302 has limited or no access to one or more wireless navigation systems. For example, if the vehicle 302 is on a narrow street surrounded by tall buildings or structures, or in an urban canyon, navigation measurements based solely on signals received from the satellites may be seriously degraded. The motor vehicle 302 may rely on terrestrial based wireless signals, for example, signals transmitted by one or more cellular base stations 304a, 304b and 304c, to assist in the navigation of the motor vehicle 302. However, like the reception of satellite signals, cellular signal reception may also be weak in urban canyons.

In an embodiment, the motor vehicle 302 is equipped with a GPS or GNSS navigation system 306, an odometer 308 and a gyroscope 310. The motor vehicle 302 may be also equipped with other instruments such as a speedometer, a compass, and so on. The odometer 308, for example, may be used to determine whether the vehicle 302 is moving or stationary. The gyroscope 310, such as a vertical gyroscope, located in the vehicle 302 may be used to determine whether the vehicle 302 is traveling in a straight line or is turning. Vehicle instruments such as the odometer 308 and the gyroscope 310 may be integral parts of the navigation system 306, or may be separate devices that are connected to the navigation system 306 through wired or wireless connections.

In an embodiment, a digital map which at least covers the location and vicinity of the vehicle 302 is stored in the navigation system 306. In an embodiment, such a digital map may be stored in the memory of the navigation system which would normally receive accurate positioning inputs from navigation satellites, for example, GPS or GNSS satellites, such that the navigation system 306 would be able to locate the position of the vehicle 302 on the digital map corresponding to the geographic position, that is, the longitude and latitude of the vehicle 302, based on signals received from GPS or GNSS satellites.

In an embodiment, measurements to help determine the direction or trajectory information of the vehicle 302 may be taken by one or more sensors, for example, the odometer 308 and the gyroscope 310 as shown in FIG. 3, as well as other vehicle instruments. Measurements from the odometer 308 may be used to determine whether the vehicle 302 is moving or stationary, for example. Measurements the gyroscope 310 may be used to determine whether the vehicle 302 is moving in a straight line or is turning, for example. The motor vehicle 302 may be equipped with other types of instruments or sensors in addition or as alternatives to the odometer 308 and the gyroscope 310 to provide sensor-assisted navigation measurements within the scope of the invention.

Like the case of a pedestrian user, an initial determination is made by using one or more sensors as to whether the direction and location information obtained from a map represents the direction and location of the vehicle 302. Instruments or sensors such as the odometer 308, the gyroscope 310 and the navigation system 306 may be used to determine whether the vehicle 302 is traveling in a straight line or is turning, whether the vehicle 302 is accelerating or decelerating, and so on. Measurements obtained from such instruments or sensors may be processed to derive trajectory information of the vehicle 302, for example. This trajectory information obtained from one or more sensors may be compared to the direction and location information obtained from a map, such as a digital map stored in the navigation system 306, for example, to determine whether the direction and location information obtained from the map represents the direction and location of the vehicle 302 with at least a sufficient level of accuracy.

In a further embodiment, if a sufficiently reliable navigation solution is obtainable from satellites, such as the GPS or GNSS satellite 104, such a navigation solution may be combined with measurements obtained from one or more instruments or sensors in the vehicle 302 to determine whether the direction and location information obtained from the map represents the direction and location of the vehicle 302, and an estimate of the level of uncertainty of the direction and location information obtained from the map. In an embodiment, the sensor itself may be a GPS or GNSS receiver, a cellular receiver, a Wi-Fi receiver or a Bluetooth receiver. Given a sufficient distance to travel in a straight line and a navigation solution of sufficient accuracy, a determination is made as to whether the direction and location information obtained from the map is sufficiently representative of the direction and location of the vehicle 302. If navigation signals received from the satellite 104 are weak or unreliable, the vehicle 302 may rely on one or more terrestrial cellular base stations 304a, 304b or 304c to obtain a navigation solution. In FIG. 3, it is assumed that the wireless environment for the vehicle 302 is less than ideal for satellite and terrestrial signal receptions, and thus the signal path 312 from the satellite 104 to the vehicle 302 and signal paths 314a, 314b and 314c from cellular base stations 304a, 304b and 304c, respectively, to the vehicle 302 are shown as dashed arrows.

Sometimes signal reception from navigation satellites might be more reliable than terrestrial base stations. At other times, terrestrial base stations might provide more reliable navigation signals than satellites. In an embodiment, navigation solutions with sufficiently reliable reception may be retained while navigation solutions based on unreliable or sporadic signal reception may be discarded. In an embodiment, sufficiently reliable navigation solutions obtained from wireless navigation sources such as satellites or cellular base stations may be combined and averaged, or combined and weighted averaged, for example, with trajectory information based on measurements obtained from one or more instruments or sensors in the motor vehicle 302, for example, the odometer 308 or the gyroscope 310, to generate sensor-assisted direction and location information.

In an embodiment, the sensor-assisted direction and location information is compared to the direction and location information obtained from the map stored in the navigation system 306 to determine whether the direction and location information obtained from the map at least substantially conforms to the sensor-assisted direction and location information, and the estimated level of uncertainty of the direction and location information obtained from the map. In an embodiment, the direction derived from the map and the uncertainty or covariance of the map-derived direction are processed in a navigation filter. In a further embodiment, the location derived from the map and the uncertainty or covariance of the map-derived location is also processed in the navigation filter. In an embodiment, the navigation filter for processing the map-derived direction and location and their uncertainties or covariances resides in a computer embedded in the navigation system 306, for example. In an embodiment, directional covariance may be obtained by performing statistics based on repeated comparisons of the direction of the user derived from the map and the direction of the user based on sensor measurements, while locational covariance may be obtained by performing statistics based on repeated comparisons of the location of the user derived from the map and the location of the user based on sensor measurements, for example.

The computer in the navigation system 306 may include a memory and a processor for executing a set of instructions stored in the memory to compute one or more navigation solutions based, at least in part, on the map-derived direction and location and the uncertainties or covariances based on sensor-assisted direction and location. The navigation solutions may include, for example, directional instructions to the driver of the vehicle 302, estimated time of arrival, and so on. Although the driver of the vehicle 302 is expected to remain on roads or highways which are stored in the navigation system 306 while driving, the actual heading of the vehicle may still be inconsistent with map information from time to time. The vehicle 302 may be in a location unmarked on the map, for example, on an unpaved road, a private road or a fire road, or in a parking lot, a parking structure or a wilderness area. In such a situation, the direction and location information obtained from the map is compared to sensor-assisted direction and location information to estimate the uncertainties or covariances based on the two sets of direction and location information. The map-derived direction and location and their uncertainties or covariances are provided to a navigation filter to compute navigation solutions for the motor vehicle 302.

Figure 4:
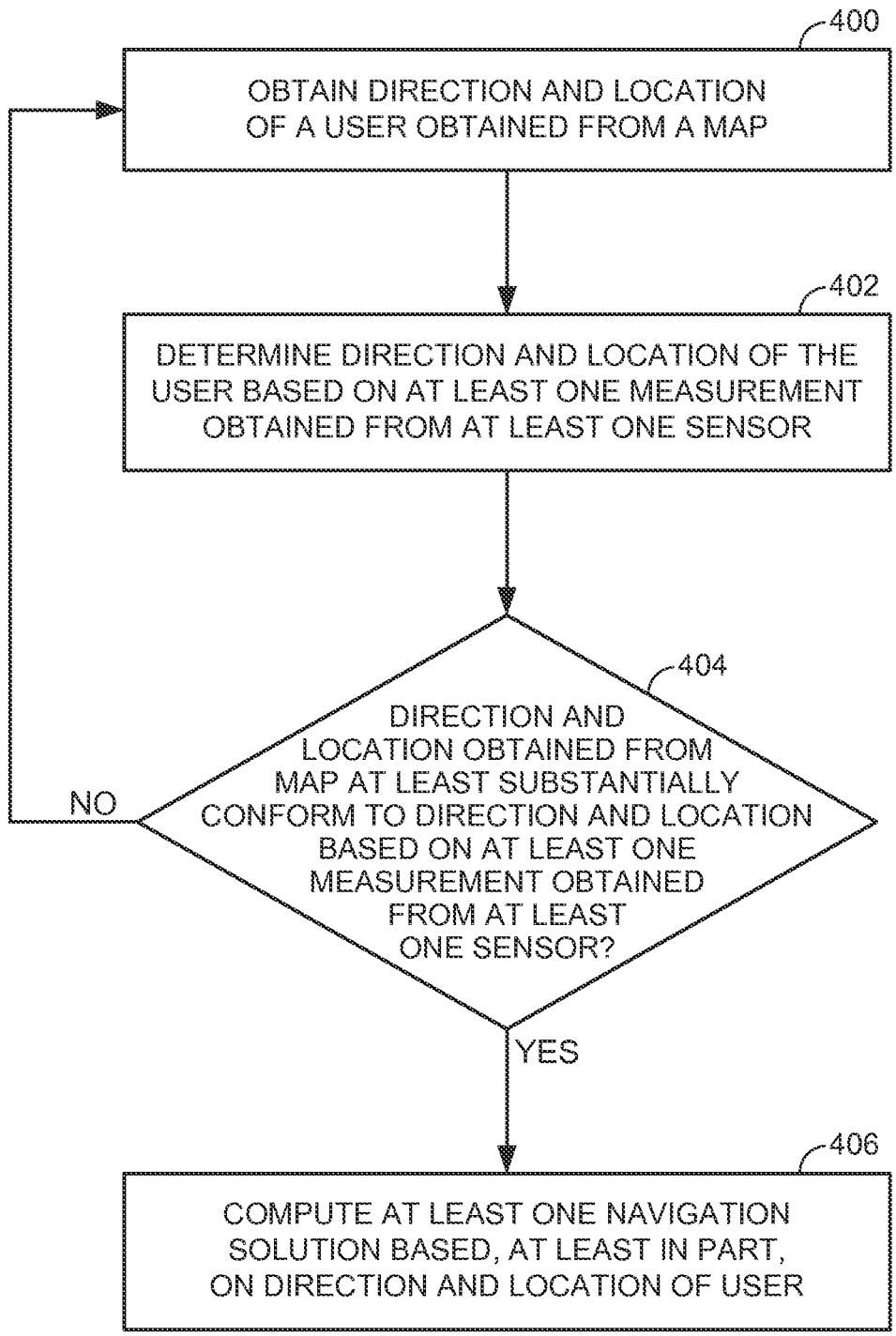
FIG. 4 is a flow chart illustrating an embodiment of a method of obtaining navigation solutions using sensor assisted validation and usage of map information.

FIG. 4 is a flowchart illustrating an embodiment of a method of obtaining sensor-assisted navigation solutions. In step 400, the direction and location of a user, which may be a user carrying a mobile device 102 as shown in FIG. 1, a pedestrian user 202 as shown in FIG. 2, or driver of a motor vehicle 302 as shown in FIG. 3, are obtained from a map, such as a digital map in a navigation system or mobile device. In FIG. 4, step 402, the direction and location of the user are determined based on at least one measurement obtained from at least one sensor. Such measurements may include trajectory information, for example, velocity, acceleration or deceleration, direction, or a change in direction or turn, obtained from one or more sensors, such as a mobile device 102 as shown in FIGS. 1 and 2, a pedometer 204, an accelerometer 206 or a gyroscope 208 as shown in FIG. 2, or an odometer 308, a gyroscope 310 or a vehicle navigation system 306 as shown in FIG. 3.

In FIG. 4, step 404, the direction and location of the user obtained from the map is compared to the direction and location of the user based on at least one measurement obtained from at least one sensor. If a determination is made that the direction and location obtained from the map at least substantially conform to the direction and location based on at least one measurement obtained from at least one sensor in step 404, then at least one navigation solution is computed based, at least in part, on the direction and location of the user in step 406. If a determination is made that the direction and location of the user obtained from the map do not substantially conform to the direction and location based on at least one measurement obtained from at least one sensor in step 404, then steps 400 and 402 are repeated until the direction and location obtained from the map substantially conform to the direction and location based on at least one measurements obtained from at least one sensor. In an embodiment, at least one navigation solution is computed in step 406 by processing the direction and its uncertainty or covariance as well as the location and its uncertainty or covariance in a navigation filter, as part of a navigation system or mobile device, for example.

Figure 5:
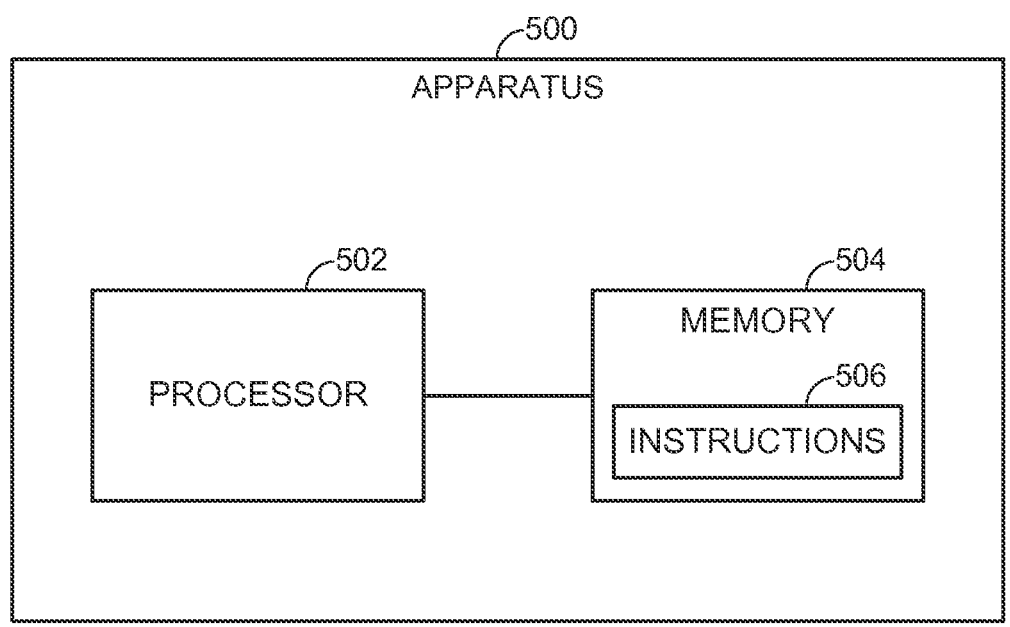
FIG. 5 is a diagram illustrating an embodiment of an apparatus configured to perform operations to obtain one or more navigation solutions.

FIG. 5 is a block diagram illustrating an apparatus 500 configured to perform operations to obtain one or more navigation solutions in an embodiment according to the present invention. In FIG. 5, the apparatus 500 comprises a processor 502 and a memory 504 for storing a set of instructions 506 executable by the processor 502 to perform process steps to obtain one or more navigation solutions. In an embodiment, the processor 502 executes instructions 506 stored in the memory 504 according to steps 400-406 as illustrated in FIG. 4 and described above. Referring to FIG. 5, the processor 502 is configured to execute the set of instructions 506 stored in the memory 504. In a further embodiment, the set of instructions 506 stored in the memory 504 and executable by the processor 502 includes instructions for estimating a directional covariance based on the direction of the user obtained from the map and the direction of the user based on one or more measurements obtained from one or more sensors. In another embodiment, the set of instructions 506 stored in the memory 504 and executable by the processor 502 includes instructions for estimating a locational covariance based on the location of the user obtained from the map and the location of the user based on one or more measurements obtained from one or more sensors. Those of skill in the art will appreciate that the apparatus 500 may be an integral part of a mobile device such as the mobile device 102 in FIGS. 1 and 2, or an integral part of a vehicle navigation system 306 in FIG. 3. Those of skill in the art will also appreciate that the apparatus 500 may be separate from a mobile device or a navigation system in other embodiments. For example, the apparatus 500 may be provided in a network, such as the network 120 in FIGS. 1-3, and navigation solutions computed by the apparatus 500 may be transmitted remotely to mobile devices such as the mobile device 102 in FIGS. 1 and 2 and vehicle navigation systems such as the navigation system 306 in FIG. 3.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences or algorithms described in connection with the embodiments disclosed herein may be embodied directly in hardware, in a software module executed by a processor, or in a combination of the two. A software module may reside in RAM, flash memory, ROM, EPROM, EEPROM, registers, a hard disk, a removable disk, a CD-ROM, or any other form of storage medium known in the art. An exemplary storage medium is coupled to the processor such that the processor can read information from, and write information to, the storage medium. In an alternative, the storage medium may be integral to the processor.

Accordingly, an embodiment of the invention can include a computer readable medium embodying a method of obtaining navigation measurements by sensor assisted navigation or usage of map information. Accordingly, the invention is not limited to illustrated examples and any means for performing the functionality described herein are included in embodiments of the invention.

While the foregoing disclosure describes illustrative embodiments of the invention, it should be noted that various changes and modifications could be made herein without departing from the scope of the invention as defined by the appended claims. The functions, steps or actions in the method and apparatus claims in accordance with the embodiments of the invention described herein need not be performed in any particular order unless explicitly stated otherwise. Furthermore, although elements of the invention may be described or claimed in the singular, the plural is contemplated unless limitation to the singular is explicitly stated.

What is claimed is:

1. A method of obtaining one or more navigation solutions, comprising:
    determining whether direction and location of a user obtained from a map at least substantially conform to the direction and location of the user based on at least one measurement obtained from at least one sensor; and
    computing at least one navigation solution based, at least in part, on the direction and location of the user based upon a determination that the direction and location of the user obtained from the map at least substantially conform to the direction and location of the user based on said at least one measurement obtained from said at least one sensor, wherein computing said at least one navigation solution based, at least in part, on the direction and location of the user comprises:
        estimating a directional covariance based on the direction of the user obtained from the map and the direction of the user based on said at least one measurement obtained from said at least one sensor.

2. The method of claim 1, further comprising:
    based upon a determination that the direction and location of the user obtained from the map do not at least substantially conform to the direction and location of the user based on said at least one measurement obtained from said at least one sensor, repeating the step of:
        determining whether the direction and location of the user obtained from the map at least substantially conform to the direction and location of the user based on said at least one measurement obtained from said at least one sensor,
    until the direction and location of the user obtained from the map at least substantially conform to the direction and location of the user based on said at least one measurement obtained from said at least one sensor.

3. The method of claim 1, wherein the step of computing said at least one navigation solution based, at least in part, on the direction and location of the user comprises estimating a locational covariance based on the location of the user obtained from the map and the location of the user based on said at least one measurement obtained from said at least one sensor.

4. The method of claim 1, wherein said at least one sensor comprises an accelerometer.

5. The method of claim 1, wherein said at least one sensor comprises a gyroscope.

6. The method of claim 1, wherein said at least one sensor comprises a pedometer.

7. The method of claim 1, wherein said at least one sensor comprises an odometer.

8. An apparatus configured to perform operations to obtain one or more navigation solutions, the apparatus comprising:
    a memory; and
    a processor for executing a set of instructions stored in the memory, the set of instructions comprising instructions to:
        determine whether direction and location of a user obtained from a map at least substantially conform to the direction and location of the user based on at least one measurement obtained from at least one sensor; and
        compute at least one navigation solution based, at least in part, on the direction and location of the user based upon a determination that the direction and location of the user obtained from the map at least substantially conform to the direction and location of the user based on said at least one measurement obtained from said at least one sensor, the instruction to compute said at least one navigation solution based, at least in part, on the direction and location of the user comprising instruction to:
            estimate a directional covariance based on the direction of the user obtained from the map and the direction of the user based on said at least one measurement obtained from said at least one sensor.

9. The apparatus of claim 8, wherein the set of instructions further comprises instructions to:
    based upon a determination that the direction and location of the user obtained from the map do not at least substantially conform to the direction and location of the user based on said at least one measurement obtained from said at least one sensor, repeating the instruction to:
    determine whether the direction and location of the user obtained from the map at least substantially conform to the direction and location of the user based on said at least one measurement obtained from said at least one sensor,
until the direction and location of the user obtained from the map at least substantially conform to the direction and location of the user based on said at least one measurement obtained from said at least one sensor.

10. The apparatus of claim 8, wherein the instruction to compute said at least one navigation solution based, at least in part, on the direction and location of the user comprises instruction for estimating a locational covariance based on the location of the user obtained from the map and the location of the user based on said at least one measurement obtained from said at least one sensor.

11. The apparatus of claim 8, wherein said at least one sensor comprises an accelerometer.

12. The apparatus of claim 8, wherein said at least one sensor comprises a gyroscope.

13. The apparatus of claim 8, wherein said at least one sensor comprises a pedometer.

14. The apparatus of claim 8, wherein said at least one sensor comprises an odometer.

15. An apparatus configured to perform operations to obtain one or more navigation solutions, the apparatus comprising:
    means for determining whether direction and location of a user obtained from a map at least substantially conform to the direction and location of the user based on at least one measurement obtained from at least one sensor; and
    means for computing at least one navigation solution based, at least in part, on the direction and location of the user based upon a determination that the direction and location of the user obtained from the map at least substantially conform to the direction and location of the user based on said at least one measurement obtained from said at least one sensor, the means for computing said at least one navigation solution based, at least in part, on the direction and location of the user comprising:
        means for estimating a directional covariance based on the direction of the user obtained from the map and the direction of the user based on said at least one measurement obtained from said at least one sensor.

16. The apparatus of claim 15, further comprising:
    means for repeating the step of determining whether the direction and location of the user obtained from the map at least substantially conform to the direction and location of the user based on said at least one measurement obtained from said at least one sensor based upon a determination that the direction and location of the user obtained from the map do not at least substantially conform to the direction and location of the user based on said at least one measurement obtained from said at least one sensor.

17. The apparatus of claim 15, wherein the means for computing said at least one navigation solution based, at least in part, on the direction and location of the user comprises means for estimating a locational covariance based on the location of the user obtained from the map and the location of the user based on said at least one measurement obtained from said at least one sensor.

18. The apparatus of claim 15, wherein said at least one sensor comprises an accelerometer.

19. The apparatus of claim 15, wherein said at least one sensor comprises a gyroscope.

20. The apparatus of claim 15, wherein said at least one sensor comprises a pedometer.

21. The apparatus of claim 15, wherein said at least one sensor comprises an odometer.

22. A non-transitory machine-readable storage medium encoded with instructions executable to perform operations to obtain one or more navigation solutions, the operations comprising operations to:
    determine whether direction and location of a user obtained from a map at least substantially conform to the direction and location of the user based on at least one measurement obtained from at least one sensor; and
    compute at least one navigation solution based, at least in part, on the direction and location of the user based upon a determination that the direction and location of the user obtained from the map at least substantially conform to the direction and location of the user based on said at least one measurement obtained from said at least one sensor, the operation to compute said at least one navigation solution based, at least in part, on the direction and location of the user comprising operation to:
        estimate a directional covariance based on the direction of the user obtained from the map and the direction of the user based on said at least one measurement obtained from said at least one sensor.

23. The non-transitory machine-readable storage medium of claim 22, wherein the operations further comprise operations to:
    based on a determination that the direction and location of the user obtained from the map do not at least substantially conform to the direction and location of the user based on said at least one measurement obtained from said at least one sensor, repeating the operation to:
        determining whether the direction and location of the user obtained from the map at least substantially conform to the direction and location of the user based on said at least one measurement obtained from said at least one sensor,
    until the direction and location of the user obtained from the map at least substantially conform to the direction and location of the user based on said at least one measurement obtained from said at least one sensor.

24. The non-transitory machine-readable storage medium of claim 22, wherein the operation to compute at least one navigation solution based, at least in part, on the direction and location of the user further comprises operation to estimate a locational covariance based on the location of the user obtained from the map and the location of the user based on said at least one measurement obtained from said at least one sensor.

25. The non-transitory machine-readable storage medium of claim 22, wherein said at least one sensor comprises an accelerometer.

26. The non-transitory machine-readable storage medium of claim 22, wherein said at least one sensor comprises a gyroscope.

* * * * *